US012785411B2

(12) United States Patent
Li

(10) Patent No.: US 12,785,411 B2
(45) Date of Patent: Nov. 3, 2026

(54) CHARGING APPARATUS AND ELECTRONIC DEVICE

(71) Applicant: VIVO MOBILE COMMUNICATION CO., LTD., Guangdong (CN)

(72) Inventor: Dahuan Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 696 days.

(21) Appl. No.: 18/359,294

(22) Filed: Jul. 26, 2023

(65) Prior Publication Data

US 2023/0378798 A1 Nov. 23, 2023

Related U.S. Application Data

(63) Continuation of application No. PCT/CN2022/073799, filed on Jan. 25, 2022.

(30) Foreign Application Priority Data

Jan. 28, 2021 (CN) ........................ 202110121739.8

(51) Int. Cl.
*H02J 7/02* (2016.01)

(52) U.S. Cl.
CPC ............. *H02J 7/02* (2013.01); *H02J 2207/50* (2020.01)

(58) Field of Classification Search
None
See application file for complete search history.

(56) References Cited

U.S. PATENT DOCUMENTS

| | | | | |
|---|---|---|---|---|
| 5,587,894 | A | 12/1996 | Naruo | |
| 6,323,623 | B1 | 11/2001 | Someya et al. | |
| 2017/0294831 | A1 * | 10/2017 | Dai | G05F 5/00 |
| 2020/0205265 | A1 | 6/2020 | Wang et al. | |

FOREIGN PATENT DOCUMENTS

| | | | |
|---|---|---|---|
| CN | 104883111 | A | 9/2015 |
| CN | 111404363 | A | 7/2020 |
| CN | 112072766 | A | 12/2020 |
| CN | 112787501 | A | 5/2021 |
| WO | 2018227278 | A1 | 12/2018 |

* cited by examiner

*Primary Examiner* — Kristy A Haupt
(74) *Attorney, Agent, or Firm* — Price Heneveld LLP

(57) ABSTRACT

A charging apparatus and an electronic device are provided. The charging apparatus includes a control module, a first switch, at least one second switch, and a plurality of capacitors, where the plurality of capacitors are connected in series; grounding between two adjacent capacitors in the plurality of capacitors is implemented through one second switch; in the plurality of capacitors, the first one of the plurality of capacitors is connected to an input voltage, and the last one of the plurality of capacitors is grounded through the first switch; and the control module controls, through the first switch and the at least one second switch based on the input voltage, the number of capacitors that are turned on in series, where the number of capacitors that are turned on in series is positively related to the input voltage.

14 Claims, 5 Drawing Sheets

CHARGING APPARATUS AND ELECTRONIC DEVICE

CROSS-REFERENCE

The present invention is a continuation application of PCT International Application No. PCT/CN2022/073799 filed on Jan. 25, 2022, which claims priority to Chinese Patent Application No. 202110121739.8, filed with the China National Intellectual Property Administration on Jan. 28, 2021, and entitled "CHARGING APPARATUS AND ELECTRONIC DEVICE", the disclosures of which are incorporated herein by reference in their entireties.

TECHNICAL FIELD

This application pertains to the field of electronic technologies, and in particular, to a charging apparatus and an electronic device.

BACKGROUND

An output power of a charging apparatus is more and more demanding. When an input voltage of the charging apparatus is low, a high output power can be implemented by a capacitor with a high capacitance. To meet output power requirements in the case of different input voltages, the charging apparatus generally adopts a capacitor with a large volume, a large weight, and high costs.

In a process of implementing this application, the inventor finds that the prior art has at least the following problem: How to reduce a volume, a weight, and costs of the charging apparatus while meeting a requirement of a high output power.

SUMMARY

Embodiments of this application aim to provide a charging apparatus and an electronic device.

This application is implemented as follows:

According to a first aspect, an embodiment of this application provides a charging apparatus. The charging apparatus includes a control module, a first switch, at least one second switch, and a plurality of capacitors, where the plurality of capacitors are connected in series; grounding between two adjacent capacitors in the plurality of capacitors is implemented through one second switch; in the plurality of capacitors, the first one of the plurality of capacitors is connected to an input voltage, and the last one of the plurality of capacitors is grounded through the first switch; and the control module controls, through the first switch and the at least one second switch based on the input voltage, the number of capacitors that are turned on in series, where the number of capacitors that are turned on in series is positively related to the input voltage.

According to second aspect, an embodiment of this application provides an electronic device. The electronic device includes the charging apparatus described above.

In the embodiments of this application, a charging apparatus includes a control module, a first switch, at least one second switch, and a plurality of capacitors, where the plurality of capacitors are connected in series; grounding between two adjacent capacitors in the plurality of capacitors is implemented through one second switch; in the plurality of capacitors, the first one of the plurality of capacitors is connected to an input voltage, and the last one of the plurality of capacitors is grounded through the first switch; and the control module controls, through the first switch and the at least one second switch based on the input voltage, the number of capacitors that are turned on in series, where the number of capacitors that are turned on in series is positively related to the input voltage.

BRIEF DESCRIPTION OF DRAWINGS

FIG. **6*a* is a schematic voltage diagram of a rectification voltage in a charging apparatus according to an embodiment of this application.

DESCRIPTION OF REFERENCE NUMERALS

11: control module; 111: power supply unit; 112: sampling unit; 113: processor unit; 114: first driver unit; 115: conversion unit; 116: second driver unit; 117: third driver unit; 118: fourth driver unit; 121: first switch; 122: first sub-switch; 123: second sub-switch; 124: third sub-switch; 131: first capacitor; 132: second capacitor; 133: third capacitor; 134: fourth capacitor; 14: filtering module; 15: rectifier module; 16: high voltage direct current; 171: first diode; 172: second diode.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

With reference to the accompanying drawings, a charging apparatus provided in the embodiments of this application is described in detail by using specific embodiments and application scenarios.

Referring to FIG. 1 to FIG. 6*b*, the embodiments of this application provide a charging apparatus and an electronic device. The charging apparatus includes a control module 11, a first switch 121, at least one second switch, and a plurality of capacitors.

The first switch 121 and the second switch may be switches of the same structure or switches of different structures. When the number of the at least one second switch is greater than one, a plurality of second switches may be switches of the same structure or switches of different structures. The first switch 121 and the second switch may be triodes, metal-oxide-semiconductor (MOS) transistors, relays, or the like, or may be switch tubes composed of a plurality of components. The capacitor may be a filter electrolytic capacitor.

The number of the at least one second switch may be one, two, or more. The number of capacitors may be a sum of the first switch and the number of the at least one second switch.

Figure 3:
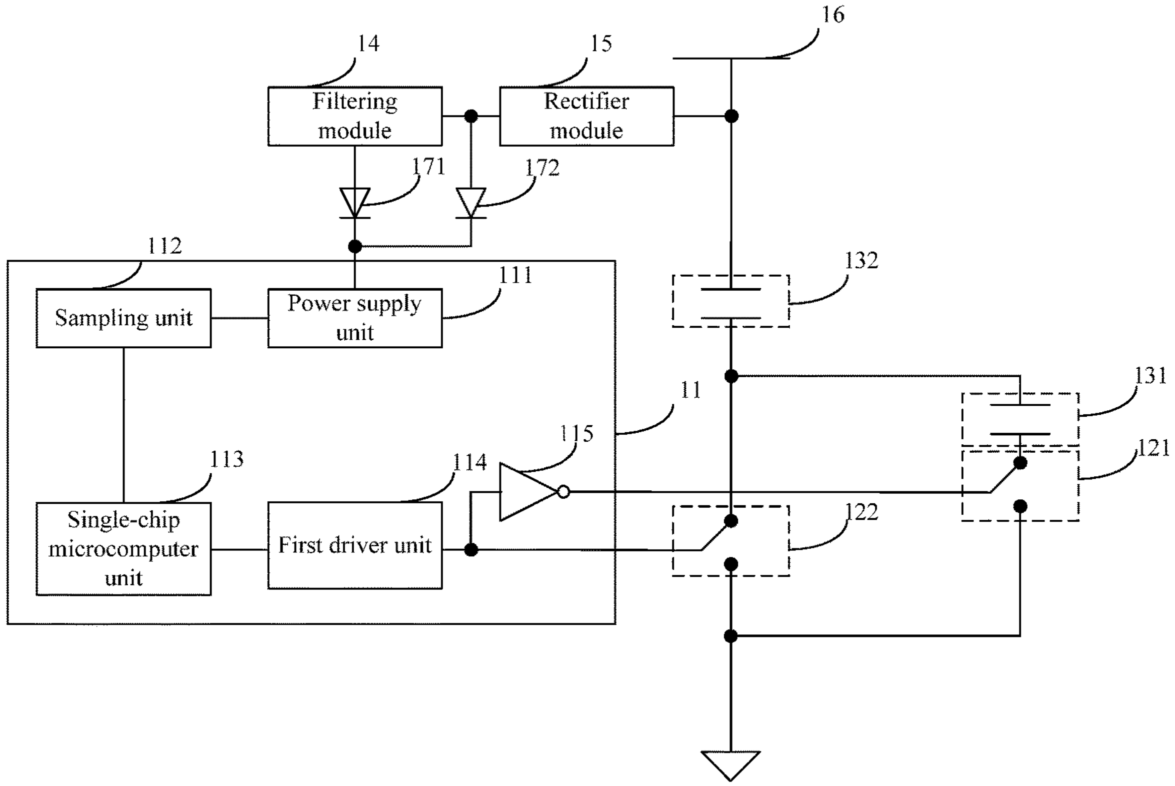
FIG. 3 is a schematic structural diagram of a third charging apparatus according to an embodiment of this application.

In an optional embodiment of the charging apparatus, the number of the at least one second switch is greater than two, a structure of the charging apparatus is similar that of a charging apparatus in FIG. 3, and the number of second switches and the number of capacitors are correspondingly increased on the basis of the structure of the charging apparatus in FIG. 3. For example, the number of the at least one second switch included in the charging apparatus is four and the number of the plurality of capacitors included in the charging apparatus is five.

The number of second switches and the number of capacitors are increased, so that a wider input voltage range and a quality requirement can be met. When total volumes of the plurality of capacitors included in the charging apparatus are the same, total capacitances of the plurality of capacitors are larger. In contrast, when total capacitances of the plurality of capacitors are the same, volumes of the plurality of capacitors are smaller.

The plurality of capacitors are connected in series.

Grounding between two adjacent capacitors in the plurality of capacitors is implemented through one second switch.

In the plurality of capacitors, the first one of the plurality of capacitors is connected to an input voltage, and the last one of the plurality of capacitors is grounded through the first switch.

The first one of the plurality of capacitors and the last one of the plurality of capacitors may be the first one and the last one of the plurality of capacitors determined by ordering the plurality of capacitors connected in series in a preset direction.

Optionally, the charging apparatus further includes a rectifier module 15, connected to the control module 11 and configured to receive the input voltage and output a rectified rectification voltage to the control module 11.

Figure 2:
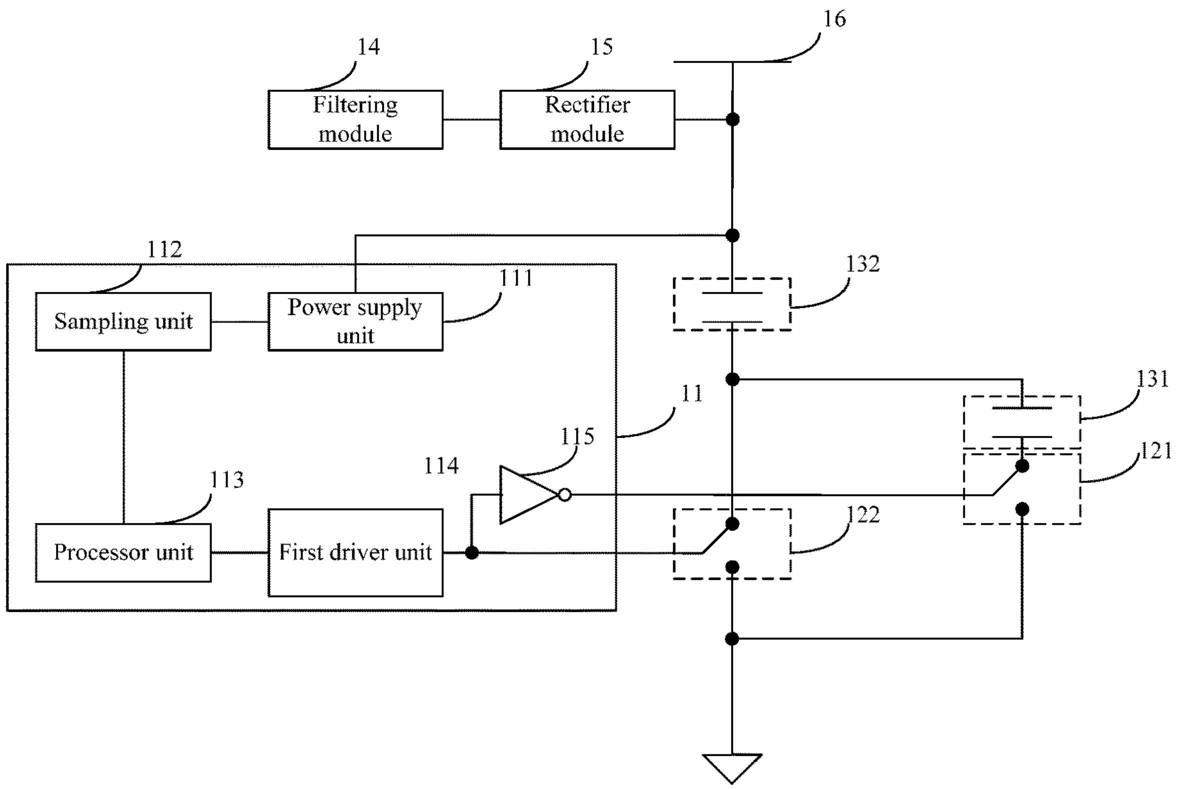
FIG. 2 is a schematic structural diagram of a second charging apparatus according to an embodiment of this application.
Figure 4:
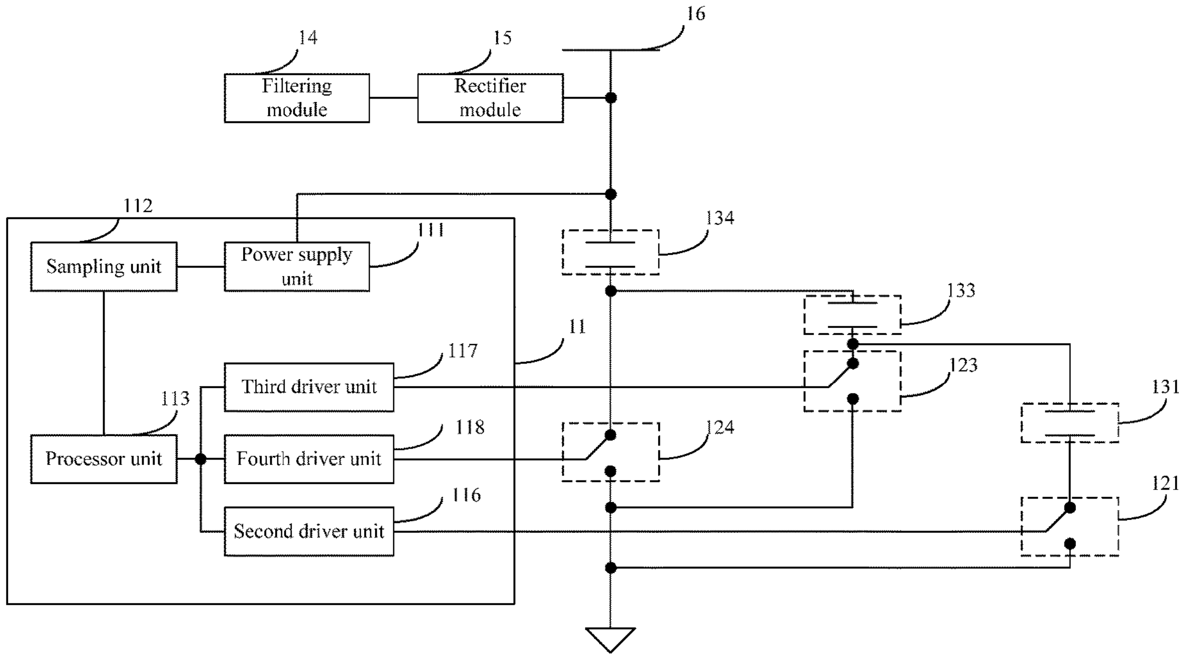
FIG. 4 is a schematic structural diagram of a fourth charging apparatus according to an embodiment of this application.

Referring to the embodiments shown in FIG. 2 and FIG. 4, an input end of the rectifier module 15 is connected to an output end of the filtering module 14, and an output end of the rectifier module 15 is connected to an input end of a power supply unit 111 in the control module 11. The input voltage connected to the first one of the plurality of capacitors may be a rectification voltage passing through the rectifier module 15 in this embodiment.

Figure 5:
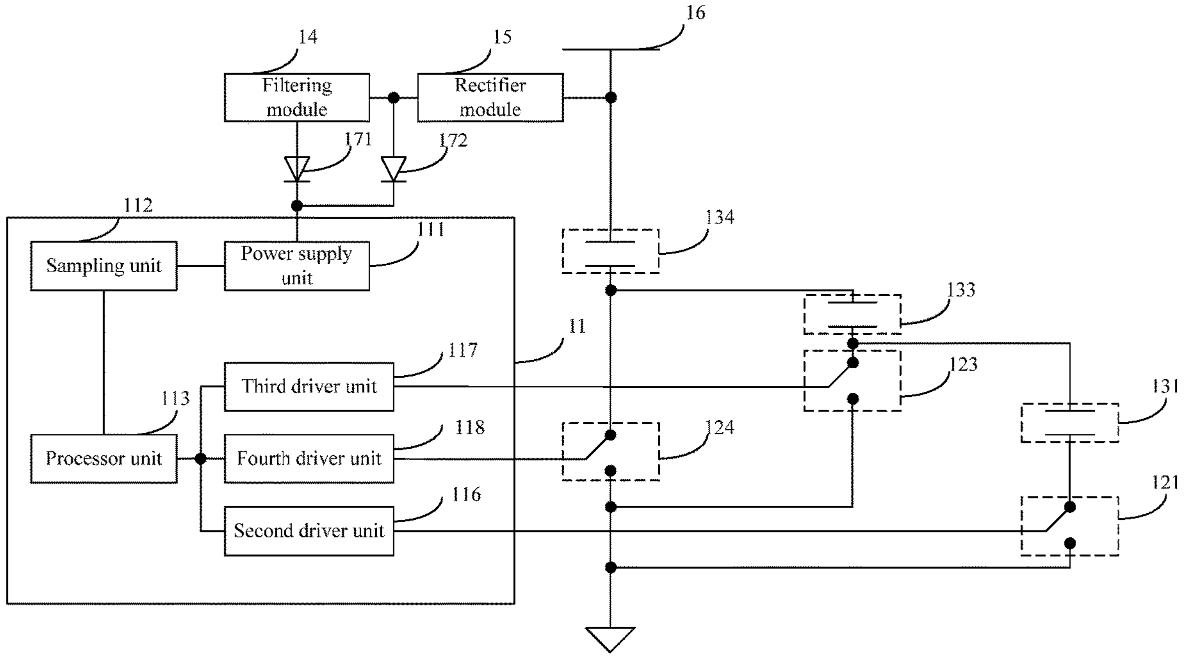
FIG. 5 is a schematic structural diagram of a fifth charging apparatus according to an embodiment of this application.

Referring to one or more embodiments shown in FIG. 3 and FIG. 5, the output end of the filtering module 14 is connected to one end of a first diode 171, and the other end of the first diode 171 is connected to the input end of the power supply unit 111. The output end of the filtering module 14 is connected to one end of the first diode 171, and the other end of the first diode 171 is connected to the input end of the power supply unit 111. The output end of the filtering module 14 is connected to one end of the second diode 172, and the other end of the second diode 172 is connected to the input end of the power supply unit.

Figure 6A:
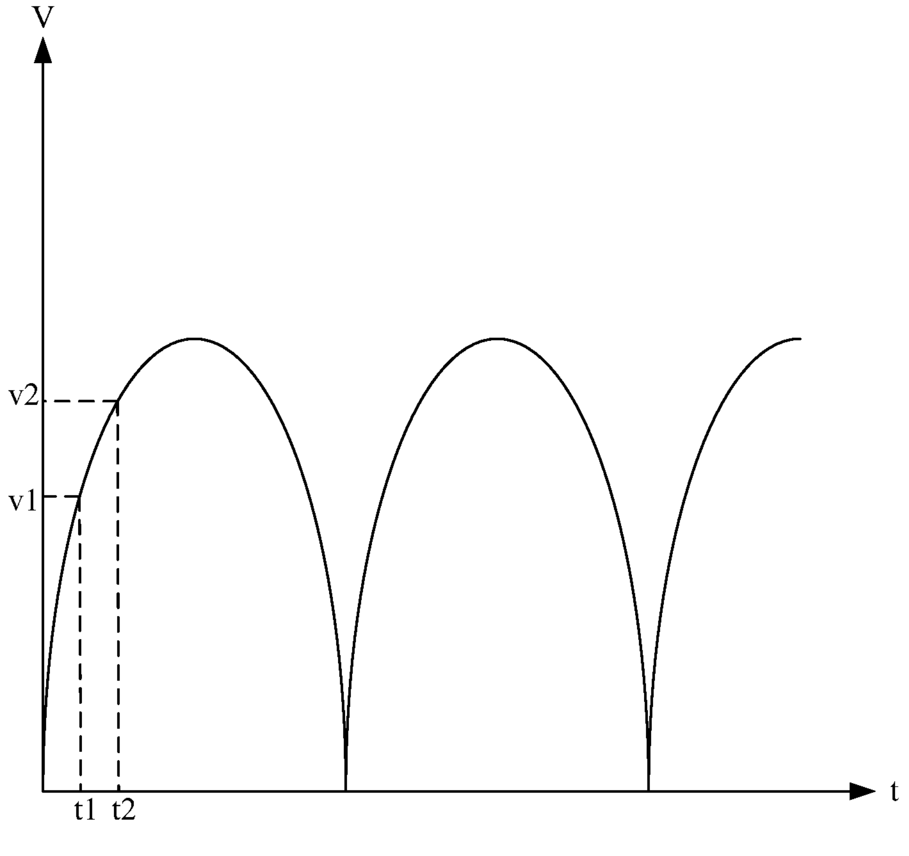
FIG. 6*b*** is a schematic voltage diagram of a rectification voltage in another charging apparatus according to an embodiment of this application.
Figure 6B:
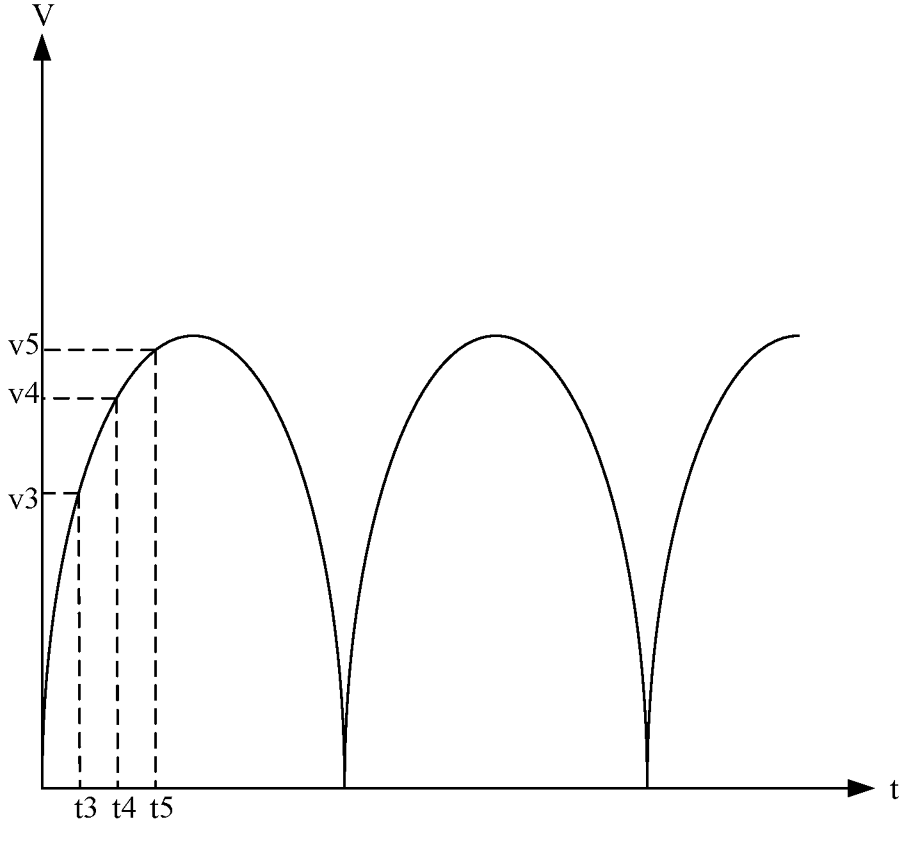

Positive and negative directions of the first diode 171 and the second diode 172 are opposite. Because a diode has unidirectional conductivity, the first diode 171 and the second diode 172 can rectify a voltage output by the output end of the filtering module 14, so that a voltage received by the power supply unit 111 is a diode rectification voltage rectified by the diode. The input voltage is an alternating current voltage including both a positive value and a negative value. After the input voltage reaches the power supply unit 111 through the diode, the diode rectification voltage received by the power supply unit 111 includes only a non-negative value, as shown in FIG. 6*a* and FIG. 6*b*.

The input voltage is rectified by the diode, so that the control module 11 can implement rectification of the input voltage without the rectifier module 15 when controlling a switch based on the input voltage.

Referring to FIG. 2, FIG. 3, FIG. 4, and FIG. 5, the input voltage connected to the first one of the plurality of capacitors may be a rectification voltage acquired at a high voltage direct current (HVDC). The rectification voltage is obtained by rectifying the input voltage through the rectifier module 15. A high voltage direct current 16 is a high-power long-distance direct current with advantages of a stable direct current with no inductance, no capacitive reactance, no synchronization, and so on. In the embodiments of this application, the high voltage direct current 16 may be regarded as a preset voltage value acquisition point for acquiring a voltage value.

The control module 11 controls, through the first switch 121 and the at least one second switch based on the input voltage, the number of capacitors that are turned on in series, where the number of capacitors that are turned on in series is positively related to the input voltage.

The input voltage may be an alternating current voltage, and in a process in which the input voltage rises from zero to a peak value of the alternating current voltage, the number of capacitors that are turned on in series increases as the voltage increases.

In some embodiments, the control module 11 may further control, based on the rectification voltage obtained through rectification of the input voltage, the first switch 121 and the at least one second switch to be turned on and turned off, to control the number of capacitors that are turned on in series, where the number of capacitors that are turned on in series is positively related to the rectification voltage. The rectification voltage is a non-negative value, and a schematic voltage diagram of the rectification voltage is shown in FIG. 6*a* and FIG. 6*b*.

Optionally, the control module 11 includes a power supply unit 111, a sampling unit 112, a processor unit 113, and a driver unit. The power supply unit 111 is connected to the sampling unit 112 and is configured to output a supply voltage to the sampling unit 112 after it is detected that the rectification voltage reaches a starting voltage threshold; the sampling unit 112 is connected to the processor unit 113 and is configured to sample the supply voltage and output a sampling voltage value to the processor unit 113; the processor unit 113 is connected to the driver unit and is configured to output a corresponding driving control signal to the driver unit based on a voltage threshold interval in which the sampling voltage value is located; and the driver unit is configured to drive, based on the driving control signal, the first switch 121 and the at least one second switch to be turned on or turned off.

Referring to FIG. 2, FIG. 3, FIG. 4, and FIG. 5, the input end of the power supply unit 111 receives the rectification voltage, and an output end of the power supply unit 111 is connected to an input end of the sampling unit 112. The power supply unit 111 does not output the supply voltage to the sampling unit 112 before it is detected that the rectification voltage reaches the starting voltage threshold, and in this case, it may be considered that the control module 11 is in a non-operating state. The power supply unit 111 continuously outputs the supply voltage to the sampling unit 112 after it is detected that the rectification voltage reaches the starting voltage threshold, and in this case, it may be considered that the control module 11 is in an operating state.

An output end of the sampling unit 112 is connected to an input end of the processor unit 113.

The processor unit 113 may be a microcontroller unit (MCU), which appropriately reduces a frequency and a specification of a central processing unit (CPU), and integrates peripheral interfaces such as a memory and a timer, and even a liquid crystal display (LCD) driver circuit on a single chip to form a chip-level computer, thereby performing different combination control for different applications.

An output end of the processor unit 113 is connected to an input end of the driver unit. There may be one or more driver units.

In the embodiments shown in FIG. 2 and FIG. 3, an output end of a single-chip microcomputer unit 113 is connected to an input end of a first driver unit 114. The first driver unit 114 is configured to drive, based on the driving control signal, the first switch 121 and a first sub-switch 122 to be turned on or turned off.

In another embodiment not shown in the accompanying drawings, the output end of the single-chip microcomputer unit 113 is separately connected to input ends of two driver units, where the first one of the driver units is configured to drive, based on the driving control signal, the first switch 121 to be turned on or turned off, and the second one of the driver units is configured to drive, based on the driving control signal, the first sub-switch 122 to be turned on or turned off.

In the embodiments shown in FIG. 4 and FIG. 5, the output end of the single-chip microcomputer unit is separately connected to a second driver unit 116, a third driver unit 117, and a fourth driver unit 118. The second driver unit is configured to drive, based on the driving control signal, the first switch 121 to be turned on or turned off, the third driver unit is configured to drive, based on the driving control signal, a second sub-switch 123 to be turned on or turned off, and the fourth driver unit is configured to drive, based on the driving control signal, a third sub-switch 124 to be turned on or turned off.

In addition, the charging apparatus in the embodiments of this application can also be used for an auxiliary power supply of a high-power supply, to reduce a volume, a weight, and costs of a capacitor.

Two specific implementations are separately described below:

Referring to FIG. 1, FIG. 2, FIG. 3, and FIG. 6*a*, an embodiment of a charging apparatus including two capacitors is specifically described.

Optionally, the at least one second switch includes a first sub-switch 122; the plurality of capacitors include a first capacitor 131 and a second capacitor 132; the first capacitor 131 and the second capacitor 132 are connected in series; grounding between the first capacitor 131 and the second capacitor 132 is implemented through the first sub-switch 122; and the second capacitor 132 is connected to the input voltage, and the first capacitor 131 is grounded through the first switch 121.

Figure 1:
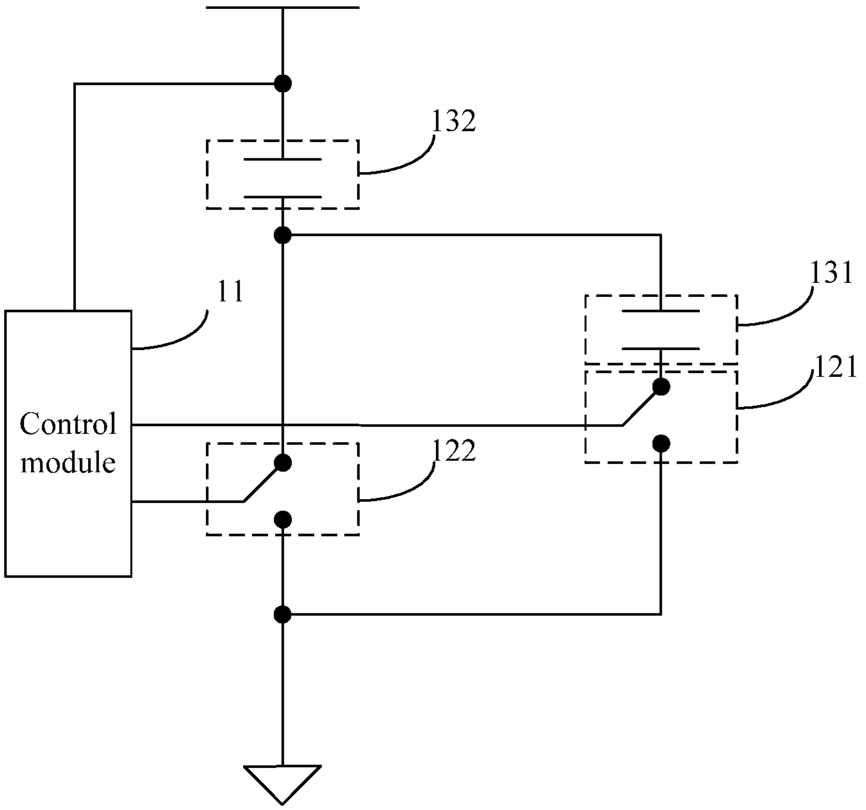
FIG. 1 is a schematic structural diagram of a first charging apparatus according to an embodiment of this application.

In one or more embodiments shown in FIG. 1, FIG. 2, and FIG. 3, the number of the at least one second switch is one, that is, the at least one second switch includes the first sub-switch 122, and the charging apparatus includes the first switch 121 and the first sub-switch 122. The number of the plurality of capacitors is two, that is, the plurality of capacitors include the first capacitor 131 and the second capacitor 132.

The second capacitor 132 is connected to the input voltage. The second capacitor 132 and the first capacitor 131 are two adjacent capacitors. That grounding between the second capacitor 132 and the first capacitor 131 is implemented through the first sub-switch 122 may be understood as that one end of the second capacitor 132 is connected to the first sub-switch 122, and is grounded when the first sub-switch 122 is turned on, and the one end that is of the second capacitor 132 and that is connected to the first sub-switch is connected to the first capacitor 131. The first capacitor 131 is grounded through the first switch 121.

Optionally, when it is detected that the rectification voltage reaches a first operating voltage threshold, the control module 11 controls the first sub-switch 122 to be turned on and the first switch 121 to be turned off, so that the second capacitor 132 is grounded and turned on; when it is detected that the rectification voltage reaches a second operating voltage threshold, the control module 11 controls the first switch 121 to be turned on and controls the first sub-switch 122 to be turned off, so that the first capacitor 131 and the second capacitor 132 are grounded in series and turned on, where the second operating voltage threshold is greater than the first operating voltage threshold; and after the rectification voltage reaches the second operating voltage threshold, the charging apparatus supplies power to a load in a state in which the first switch 121 remains to be turned on and the first sub-switch 122 is turned off.

The rectification voltage may be a voltage obtained through rectification of the alternating current voltage. A voltage waveform of the rectification voltage is shown in FIG. 6*a*. A voltage value of the rectification voltage is a non-negative value, and the voltage value of the rectification voltage rises from zero to a peak value of the voltage waveform and falls from the peak value to zero, and rises again from zero to the peak value and falls from the peak value to zero. The process of rising and falling of the voltage value is continuously repeated.

Initial states of both the first switch 121 and the first sub-switch 122 may be an off state. In this case, neither the first capacitor 131 nor the second capacitor 132 is grounded to be turned on, and the charging apparatus is in a non-operating state.

Before a time point t1 shown in FIG. 6*a*, the power supply unit of the control module 11 receives the rectification voltage, but the voltage value of the rectification voltage is less than the first operating voltage threshold v1. In this case, the power supply unit 111 does not output the supply voltage to the sampling unit, and the control module 11 is in a non-operating state and does not perform any control on the first switch 121 or the first sub-switch 122. Herein, the first operating voltage threshold v1 may be a starting voltage threshold for the power supply unit 111 to output the supply voltage.

At the time point t1 shown in FIG. 6a, the control module 11 detects that the rectification voltage reaches the first operating voltage threshold v1. In this case, the control module 11 controls the first sub-switch 122 to be turned on and the first switch 121 to be turned off, so that the second capacitor 132 is grounded and turned on.

At a time point t2 shown in FIG. 6a, the control module 11 detects that the rectification voltage reaches the second operating voltage threshold v2. In this case, the control module 11 controls the first switch 121 to be turned on and the first sub-switch 122 to be turned off, so that the first capacitor 131 and the second capacitor 132 are grounded in series and turned on, where the second operating voltage threshold v2 is greater than the first operating voltage threshold v1.

After the time point t2 shown in FIG. 6a, the first switch 121 remains to be turned on and the first sub-switch 122 remains to be turned off. In this case, the first capacitor 131 and the second capacitor 132 remain to be grounded in series and turned on, and the charging apparatus supplies the power to the load in this state.

It should be noted that although the voltage value of the rectification voltage continuously repeats the process of rising and falling of the voltage value, the control module 11 performs, only when the voltage value reaches the first operating voltage threshold v1 for the first time, that is, at the time point t1, the switch control operation of controlling the first sub-switch 122 to be turned on and the first switch 121 to be turned off, and performs, when the voltage value reaches the second operating voltage threshold v2 for the first time, that is, at the time point t2, the switch control operation of controlling the first switch 121 to be turned on and the first sub-switch 122 to be turned off. When the voltage value reaches the first operating voltage threshold v1 for the second time, the third time . . . or the $N^{th}$ time, the control module 11 no longer performs any switch control operation. Similarly, when the voltage value reaches the second operating voltage threshold v2 for the second time, the third time . . . or the $N^{th}$ time, the control module 11 no longer performs any switch control operation.

The first switch 121 and the first sub-switch 122 are controlled to be turned on or turned off in the case of different input voltages, so that the charging apparatus can meet a requirement of a high output power due to the following reason:

For a calculation formula of an output power W of the charging apparatus, refer to the following formula:

$W=\frac{1}{2}CV^2$, where

C is a total capacitance value of the charging apparatus, and V is the input voltage of the charging apparatus.

In a case that the input voltage is low, for example, when the voltage value of the rectification voltage is greater than or equal to the first operating voltage threshold v1 and less than the second operating voltage threshold v2, only the second capacitor 132 in the charging apparatus is grounded and turned on, and the first capacitor and the second capacitor are connected in parallel, where the total capacitance value C of the charging apparatus is a sum of capacitance values of the first capacitor 131 and the second capacitor 132, and the total capacitance value C is greater than the capacitance value of either the first capacitor 131 or the second capacitor 132. Therefore, when the input voltage is low, the charging apparatus controls the first switch 121 and the first sub-switch 122 to be turned on and turned off, to control the number of capacitors that are turned on in series to be one. In this case, the capacitance value of the charging apparatus is large, and even though the input voltage is low, a requirement of a high output power can still be met. In addition, because the total capacitance value is large and a filtering effect of a capacitor is better, the charging apparatus can provide a low ripple output and stabilize a circuit when supplying power to the load.

In a case that the input voltage is high, for example, when the voltage value of the rectification voltage is greater than or equal to the second operating voltage threshold v2, the first capacitor 131 and the second capacitor 132 in the charging apparatus are grounded in series and turned on, the total capacitance value C of the charging apparatus is a reciprocal of a sum of reciprocals of the capacitance values of the first capacitor 131 and the second capacitor 132, the total capacitance value C is less than the capacitance value of either the first capacitor 131 or the second capacitor 132, and a withstand voltage of the first capacitor 131 or the second capacitor 132 increases. Therefore, when the input voltage is high, the charging apparatus controls the first switch 121 and the first sub-switch 122 to be turned on and turned off, to control the number of capacitors that are turned on in series to be two. In this case, although the capacitance value of the charging apparatus is small, the input voltage is high, so that a requirement of a high output power can be met. In addition, the capacitor can be prevented from being damaged because the input voltage is too high, thereby achieving high reliability.

Optionally, the control module further includes a conversion unit, where the conversion unit is connected to the first switch or the first sub-switch and is configured to: receive a first level supplied by a driver unit, convert the first level into a second level, and output the second level to the first switch or the first sub-switch.

The conversion unit may be a NOT gate and is configured to a low level into a high level, or convert a high level into a low level. When the first level is a high level, the second level is a low level; or when the first level is a low level, the second level is a high level. The high level may be a level at which the drive switch is turned on, and correspondingly, the low level may be a level at which the drive switch is turned off; or the high level may be a level at which the drive switch is turned off, and correspondingly, the low level may be a level at which the drive switch is turned on.

In one or more embodiments shown in FIG. 2 and FIG. 3, an output end of the first driver unit 114 is connected to the first sub-switch 122, the output end of the first driver unit 114 is connected to an input end of the conversion unit 115, and an output end of the conversion unit 115 is connected to the first switch 121. In this case, the conversion unit can synchronously control, by using one first level supplied by the first driver unit 114, the first switch 121 to be turned on and the first sub-switch 122 to be turned off, or control the first switch 121 to be turned off and the first sub-switch 122 to be turned on.

In one or more embodiments not shown in some other accompanying drawings, an output end of the first driver unit 114 is connected to the first switch 121, the output end of the first driver unit 114 is connected to an input end of the conversion unit 115, and an output end of the conversion unit 115 is connected to the first sub-switch 122. In this case, the conversion unit can synchronously control, by using one first level supplied by the first driver unit 114, the first switch 121 to be turned on and the first sub-switch 122 to be turned off, or control the first switch 121 to be turned off and the first sub-switch 122 to be turned on.

Then, referring to FIG. 1, FIG. 4, FIG. 5, and FIG. 6*b*, an embodiment of a charging apparatus including three capacitors is specifically described.

Optionally, the at least one second switch includes a second sub-switch 123 and a third sub-switch 124; the plurality of capacitors include a first capacitor 131, a third capacitor 133, and a fourth capacitor 134; the first capacitor 131, the third capacitor 133, and the fourth capacitor 134 are connected in series; grounding between the first capacitor 131 and the third capacitor 133 is implemented through the second sub-switch 123; grounding between the third capacitor 133 and the fourth capacitor 134 is implemented through the third sub-switch 124; and the fourth capacitor 134 is connected to the input voltage, and the first capacitor 131 is grounded through the first switch 121.

In one or more embodiments shown in FIG. 4 and FIG. 5, the number of the at least one second switch is two, that is, the at least one second switch includes the second sub-switch 123 and the third sub-switch 124, and the charging apparatus includes the first switch 121, the second sub-switch 123, and the third sub-switch 124. The number of the plurality of capacitors is three, that is, the plurality of capacitors include the first capacitor 131, the third capacitor 133, and the fourth capacitor 134.

The second capacitor 132 is connected to the input voltage. The second capacitor 132 and the first capacitor 131 are two adjacent capacitors. That grounding between the second capacitor 132 and the first capacitor 131 is implemented through the first sub-switch 122 may be understood as that one end of the second capacitor 132 is connected to the first sub-switch 122, and is grounded when the first sub-switch 122 is turned on, and the one end that is of the second capacitor 132 and that is connected to the first sub-switch is connected to the first capacitor 131. The first capacitor 131 is grounded through the first switch 121.

The fourth capacitor 134 is connected to the input voltage. The fourth capacitor 134 and the third capacitor 133 are two adjacent capacitors. That grounding between the fourth capacitor 134 and the third capacitor 133 is implemented through the third sub-switch 124 may be understood as that one end of the fourth capacitor 134 is connected to the third sub-switch 124, and is grounded when the third sub-switch 124 is turned on, and the one end that is of the fourth capacitor 134 and that is connected to the third sub-switch 124 is connected to the third capacitor 133.

The third capacitor 133 and the first capacitor 131 are two adjacent capacitors. That grounding between the third capacitor 133 and the first capacitor 131 is implemented through the second sub-switch 123 may be understood as that one end of the third capacitor 133 is connected to the second sub-switch 123, and is grounded when the second sub-switch 123 is turned on, and the one end that is of the third capacitor 133 and that is connected to the second sub-switch 123 is connected to the first capacitor 131.

The first capacitor 131 is grounded through the first switch 121.

Optionally, when it is detected that the rectification voltage reaches a third operating voltage threshold, the control module 11 controls the third sub-switch 124 to be turned on and controls the second sub-switch 123 and the first switch 121 to be turned off, so that the fourth capacitor 134 is grounded and turned on; when it is detected that the rectification voltage reaches a fourth operating voltage threshold, the control module 11 controls the second sub-switch 123 to be turned on and controls the third sub-switch 124 and the first switch 121 to be turned off, so that the fourth capacitor 134 and the third capacitor 133 are grounded in series and turned on, where the fourth operating voltage threshold is greater than the third operating voltage threshold; when it is detected that the rectification voltage reaches a fifth operating voltage threshold, the control module 11 controls the first switch 121 to be turned on and controls the second sub-switch 123 and the third sub-switch 124 to be turned off, so that the fourth capacitor 134, the third capacitor 133, and the first capacitor 131 are grounded in series and turned on, where the fifth operating voltage threshold is greater than the fourth operating voltage threshold; and after the rectification voltage reaches the fifth operating voltage threshold, the charging apparatus supplies power to a load in a state in which the first switch 121 remains to be turned on and the second sub-switch 123 and the third sub-switch 124 are turned off.

The rectification voltage may be a voltage obtained through rectification of the alternating current voltage. A voltage waveform of the rectification voltage is shown in FIG. 6*b*. A voltage value of the rectification voltage is a non-negative value, and the voltage value of the rectification voltage rises from zero to a peak value of the voltage waveform and falls from the peak value to zero, and rises again from zero to the peak value and falls from the peak value to zero. The process of rising and falling of the voltage value is continuously repeated.

Initial states of the first switch 121, the second sub-switch 123, and the third sub-switch 124 may be all an off state. In this case, the first capacitor 131, the third capacitor 133, and the fourth capacitor 134 are all grounded to be turned on, and the charging apparatus is in a non-operating state.

Before a time point t3 shown in FIG. 6*b*, the power supply unit of the control module 11 receives the rectification voltage, but the voltage value of the rectification voltage is less than the third operating voltage threshold v3. In this case, the power supply unit 111 does not output the supply voltage to the sampling unit, and the control module 11 is in a non-operating state and does not perform any control on the first switch 121, the second sub-switch 123, or the third sub-switch 124. Herein, the third operating voltage threshold v3 may be a starting voltage threshold for the power supply unit 111 to output the supply voltage.

At the time point t3 shown in FIG. 6*b*, the control module 11 detects that the rectification voltage reaches the third operating voltage threshold v3. In this case, the control module 11 controls the third sub-switch 124 to be turned on and controls the second sub-switch 123 and the first switch 121 to be turned off, so that the fourth capacitor 134 is grounded and turned on.

At a time point t4 shown in FIG. 6*b*, the control module 11 detects that the rectification voltage reaches the fourth operating voltage threshold v2. In this case, the control module 11 controls the second sub-switch 123 to be turned on and controls the third sub-switch 124 and the first switch 121 to be turned off, so that the fourth capacitor 134 and the third capacitor 133 are grounded in series and turned on, where the fourth operating voltage threshold v4 is greater than the third operating voltage threshold v3.

At a time point t5 shown in FIG. 6*b*, the control module 11 detects that the rectification voltage reaches the fifth operating voltage threshold v5. In this case, the control module 11 controls the first switch 121 to be turned on and controls the second sub-switch 123 and the third sub-switch 124 to be turned off, so that the fourth capacitor 134, the third capacitor 133, and the first capacitor 131 are grounded in series and turned on, where the fifth operating voltage threshold v5 is greater than the fourth operating voltage threshold v4.

After the time point t5 shown in FIG. 6*b*, the first switch 121 remains to be turned on and the second sub-switch 123 and the third sub-switch 124 remain to be turned off. In this case, the fourth capacitor 134, the third capacitor 133, and the first capacitor 131 are remain to be grounded in series and turned on, and the charging apparatus supplies the power to the load in this state.

It should be noted that although the voltage value of the rectification voltage continuously repeats the process of rising and falling of the voltage value, the control module 11 performs, only when the voltage value reaches the third operating voltage threshold v3 for the first time, that is, at the time point t3, the switch control operation of controlling the third sub-switch 124 to be turned on and the second sub-switch 123 and the first switch 121 to be turned off; the control module 11 performs, only when the voltage value reaches the fourth operating voltage threshold v4 for the first time, that is, at the time point t4, the switch control operation of controlling the second sub-switch 123 to be turned on and the third sub-switch 124 and the first switch 121 to be turned off; and the control module 11 performs, only when the voltage value reaches the fifth operating voltage threshold v5 for the first time, that is, at the time point t5, the switch control operation of controlling the first switch 121 to be turned on and the second sub-switch 123 and the third sub-switch 124 to be turned off. When the voltage value reaches the third operating voltage threshold v3 for the second time, the third time . . . or the $N^{th}$ time, the control module 11 no longer performs any switch control operation. Similarly, when the voltage value reaches the fourth operating voltage threshold v4 or the fifth operating voltage threshold v5 for the second time, the third time . . . or the $N^{th}$ time, the control module 11 no longer performs any switch control operation.

A peak value of the input voltage is usually fixed, and a peak value of the rectification voltage obtained through rectification of the input voltage is also a fixed value. Therefore, it is detected that a value of the rectification voltage reaches a specific threshold, so that a voltage threshold interval corresponding to the rectification voltage can be determined. The voltage threshold interval may be a highest voltage threshold interval that the rectification voltage can reach in a plurality of voltage threshold intervals, to determine a circuit connection mode that matches the input voltage, and control each switch to be turned on or turned off, so that the charging apparatus can meet a requirement of a high output power.

The first switch 121, the second sub-switch 123, and the third sub-switch 124 are controlled to be turned on or turned off in the case of different input voltages, so that the charging apparatus can meet a requirement of a high output power due to the reason similar to that in the foregoing embodiment of the charging apparatus including two capacitors. Details are not described herein.

Based on the charging apparatus disclosed in the embodiments of this application, an embodiment of this application further discloses an electronic device. The disclosed electronic device includes the charging apparatus described above. The electronic device in this embodiment of this application may be a device such as a smartphone, a tablet computer, an e-book reader, or a wearable apparatus. A specific type of the electronic device is not limited in this embodiment of this application.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A charging apparatus, wherein the charging apparatus comprises a control module, a first switch, at least one second switch, and a plurality of capacitors, wherein the plurality of capacitors are connected in series;

grounding between two adjacent capacitors in the plurality of capacitors is implemented through one second switch;

in the plurality of capacitors, the first one of the plurality of capacitors is connected to an input voltage, and the last one of the plurality of capacitors is grounded through the first switch; and the control module controls, through the first switch and the at least one second switch based on the input voltage, the number of capacitors that are turned on in series, wherein the number of capacitors that are turned on in series is positively related to the input voltage;

wherein the at least one second switch comprises a second sub-switch and a third sub-switch, and the plurality of capacitors comprise a first capacitor, a third capacitor, and a fourth capacitor;

the first capacitor, the third capacitor, and the fourth capacitor are connected in series;

grounding between the first capacitor and the third capacitor is implemented through the second sub-switch;

grounding between the third capacitor and the fourth capacitor is implemented through the third sub-switch; and the fourth capacitor is connected to the input voltage, and the first capacitor is grounded through the first switch.

2. The charging apparatus according to claim 1, wherein the charging apparatus further comprises:

a rectifier module, connected to the control module and configured to receive the input voltage and output a rectified rectification voltage to the control module.

3. The charging apparatus according to claim 2, wherein the control module comprises a power supply unit, a sampling unit, a processor unit, and a driver unit, wherein the power supply unit is connected to the sampling unit and is configured to output a supply voltage to the sampling unit after it is detected that the rectification voltage reaches a starting voltage threshold;

the sampling unit is connected to the processor unit and is configured to sample the supply voltage and output a sampling voltage value to the processor unit;

the processor unit is connected to the driver unit and is configured to output a corresponding driving control signal to the driver unit based on a voltage threshold interval in which the sampling voltage value is located; and the driver unit is configured to drive, based on the driving control signal, the first switch and the at least one second switch to be turned on or turned off.

4. An electronic device, comprising a charging apparatus, wherein the charging apparatus comprises a control module, a first switch, at least one second switch, and a plurality of capacitors, wherein the plurality of capacitors are connected in series;

grounding between two adjacent capacitors in the plurality of capacitors is implemented through one second switch;

in the plurality of capacitors, the first one of the plurality of capacitors is connected to an input voltage, and the last one of the plurality of capacitors is grounded through the first switch; and the control module controls, through the first switch and the at least one second switch based on the input voltage, the number of capacitors that are turned on in series, wherein the number of capacitors that are turned on in series is positively related to the input voltage;

wherein the at least one second switch comprises a second sub-switch and a third sub-switch, and the plurality of capacitors comprise a first capacitor, a third capacitor, and a fourth capacitor;

the first capacitor, the third capacitor, and the fourth capacitor are connected in series;

grounding between the first capacitor and the third capacitor is implemented through the second sub-switch;

grounding between the third capacitor and the fourth capacitor is implemented through the third sub-switch; and the fourth capacitor is connected to the input voltage, and the first capacitor is grounded through the first switch.

5. The charging apparatus according to claim 2, wherein the at least one second switch comprises a first sub-switch, and the plurality of capacitors comprise a first capacitor and a second capacitor;

the first capacitor and the second capacitor are connected in series;

grounding between the first capacitor and the second capacitor is implemented through the first sub-switch; and the second capacitor is connected to the input voltage, and the first capacitor is grounded through the first switch.

6. The charging apparatus according to claim 5, wherein when it is detected that the rectification voltage reaches a first operating voltage threshold, the control module controls the first sub-switch to be turned on and controls the first switch to be turned off, so that the second capacitor is grounded and turned on;

when it is detected that the rectification voltage reaches a second operating voltage threshold, the control module controls the first switch to be turned on and controls the first sub-switch to be turned off, so that the first capacitor and the second capacitor are grounded in series and turned on, wherein the second operating voltage threshold is greater than the first operating voltage threshold; and after the rectification voltage reaches the second operating voltage threshold, the charging apparatus supplies power to a load in a state in which the first switch remains to be turned on and the first sub-switch is turned off.

7. The charging apparatus according to claim 5, wherein the control module further comprises a conversion unit, wherein the conversion unit is connected to the first switch or the first sub-switch and is configured to: receive a first level supplied by a driver unit, convert the first level into a second level, and output the second level to the first switch or the first sub-switch.

8. The charging apparatus according to claim 1, wherein when it is detected that the rectification voltage reaches a third operating voltage threshold, the control module controls the third sub-switch to be turned on and controls the second sub-switch and the first switch to be turned off, so that the fourth capacitor is grounded and turned on;

when it is detected that the rectification voltage reaches a fourth operating voltage threshold, the control module controls the second sub-switch to be turned on and controls the third sub-switch and the first switch to be turned off, so that the fourth capacitor and the third capacitor are grounded in series and turned on, wherein the fourth operating voltage threshold is greater than the third operating voltage threshold;

when it is detected that the rectification voltage reaches a fifth operating voltage threshold, the control module controls the first switch to be turned on and controls the second sub-switch and the third sub-switch to be turned off, so that the fourth capacitor, the third capacitor, and the first capacitor are grounded in series and turned on, wherein the fifth operating voltage threshold is greater than the fourth operating voltage threshold; and after the rectification voltage reaches the fifth operating voltage threshold, the charging apparatus supplies power to a load in a state in which the first switch remains to be turned on and the second sub-switch and the third sub-switch off are turned off.

9. The electronic device according to claim 4, wherein when it is detected that the rectification voltage reaches a third operating voltage threshold, the control module controls the third sub-switch to be turned on and controls the second sub-switch and the first switch to be turned off, so that the fourth capacitor is grounded and turned on;

when it is detected that the rectification voltage reaches a fourth operating voltage threshold, the control module controls the second sub-switch to be turned on and controls the third sub-switch and the first switch to be turned off, so that the fourth capacitor and the third capacitor are grounded in series and turned on, wherein the fourth operating voltage threshold is greater than the third operating voltage threshold;

when it is detected that the rectification voltage reaches a fifth operating voltage threshold, the control module controls the first switch to be turned on and controls the second sub-switch and the third sub-switch to be turned off, so that the fourth capacitor, the third capacitor, and the first capacitor are grounded in series and turned on, wherein the fifth operating voltage threshold is greater than the fourth operating voltage threshold; and after the rectification voltage reaches the fifth operating voltage threshold, the charging apparatus supplies power to a load in a state in which the first switch remains to be turned on and the second sub-switch and the third sub-switch off are turned off.

10. The electronic device according to claim 9, wherein the charging apparatus further comprises:

a rectifier module, connected to the control module and configured to receive the input voltage and output a rectified rectification voltage to the control module.

11. The electronic device according to claim 10, wherein the control module comprises a power supply unit, a sampling unit, a processor unit, and a driver unit, wherein the power supply unit is connected to the sampling unit and is configured to output a supply voltage to the sampling unit after it is detected that the rectification voltage reaches a starting voltage threshold;

the sampling unit is connected to the processor unit and is configured to sample the supply voltage and output a sampling voltage value to the processor unit;

the processor unit is connected to the driver unit and is configured to output a corresponding driving control signal to the driver unit based on a voltage threshold interval in which the sampling voltage value is located; and the driver unit is configured to drive, based on the driving control signal, the first switch and the at least one second switch to be turned on or turned off.

12. The electronic device according to claim 10, wherein the at least one second switch comprises a first sub-switch, and the plurality of capacitors comprise a first capacitor and a second capacitor;

the first capacitor and the second capacitor are connected in series;

grounding between the first capacitor and the second capacitor is implemented through the first sub-switch; and the second capacitor is connected to the input voltage, and the first capacitor is grounded through the first switch.

13. The electronic device according to claim 12, wherein when it is detected that the rectification voltage reaches a first operating voltage threshold, the control module controls the first sub-switch to be turned on and controls the first switch to be turned off, so that the second capacitor is grounded and turned on;

when it is detected that the rectification voltage reaches a second operating voltage threshold, the control module controls the first switch to be turned on and controls the first sub-switch to be turned off, so that the first capacitor and the second capacitor are grounded in series and turned on, wherein the second operating voltage threshold is greater than the first operating voltage threshold; and after the rectification voltage reaches the second operating voltage threshold, the charging apparatus supplies power to a load in a state in which the first switch remains to be turned on and the first sub-switch is turned off.

14. The electronic device according to claim 12, wherein the control module further comprises a conversion unit, wherein the conversion unit is connected to the first switch or the first sub-switch and is configured to: receive a first level supplied by a driver unit, convert the first level into a second level, and output the second level to the first switch or the first sub-switch.

* * * * *